US010997136B2

(12) United States Patent
Mark

(10) Patent No.: US 10,997,136 B2
(45) Date of Patent: May 4, 2021

(54) METHOD AND APPARATUS FOR IDENTIFYING DATA INCONSISTENCY IN A DISPERSED STORAGE NETWORK

(71) Applicant: International Business Machines Corporation, Armonk, NY (US)

(72) Inventor: Zachary J. Mark, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 232 days.

(21) Appl. No.: 16/359,318

(22) Filed: Mar. 20, 2019

(65) Prior Publication Data

US 2019/0220451 A1    Jul. 18, 2019

Related U.S. Application Data

(63) Continuation of application No. 15/230,113, filed on Aug. 5, 2016, now Pat. No. 10,268,712, which is a continuation of application No. 12/753,569, filed on Apr. 2, 2010, now Pat. No. 9,411,810.

(60) Provisional application No. 61/237,650, filed on Aug. 27, 2009.

(51) Int. Cl.
| G06F 16/215 | (2019.01) |
| G06F 16/10  | (2019.01) |
| G06F 16/23  | (2019.01) |

(52) U.S. Cl.
CPC ............ *G06F 16/215* (2019.01); *G06F 16/10* (2019.01); *G06F 16/2365* (2019.01)

(58) Field of Classification Search
CPC ..... G06F 16/215; G06F 16/2365; G06F 16/10

USPC ........................................................ 707/691
See application file for complete search history.

(56) References Cited

U.S. PATENT DOCUMENTS

| 4,092,732 | A |   | 5/1978  | Ouchi |
| 5,454,101 | A |   | 9/1995  | Mackay et al. |
| 5,485,474 | A |   | 1/1996  | Rabin |
| 5,774,643 | A |   | 6/1998  | Lubbers et al. |
| 5,802,364 | A |   | 9/1998  | Senator et al. |
| 5,809,285 | A |   | 9/1998  | Hilland |
| 5,845,292 | A | * | 12/1998 | Bohannon ........... G06F 11/1469 |
| 5,890,156 | A |   | 3/1999  | Rekieta et al. |

(Continued)

OTHER PUBLICATIONS

Chung; An Automatic Data Segmentation Method for 3D Measured Data Points; National Taiwan University; pp. 1-8; 1998.

(Continued)

*Primary Examiner* — Mark E Hershley
(74) *Attorney, Agent, or Firm* — Garlick & Markison; Timothy W. Markison; Kelly H. Hale

(57) ABSTRACT

A method includes generating integrity data of one or more slice names of one or more error encoded data slices and evaluating the integrity data, without using any of the error encoded data slices, for an inconsistency between the plurality of received integrity data. The method further includes indicating an error based on the evaluating the integrity data indicating an inconsistency, retrieving one or more slice names for the one or more error encoded data slices, and when detecting that at least one data error has occurred at a plurality of storage units at a DSN site/pillar, determine that a DSN site/pillar failure has occurred and after a predetermined time period, if the DSN site/pillar failure has not been resolved, rebuild the error encoded data slices of the DSN site/pillar and store them at another DSN site/storage unit.

20 Claims, 13 Drawing Sheets

(56) References Cited

U.S. PATENT DOCUMENTS

| | | | |
|---|---|---|---|
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,446,092 B1 * | 9/2002 | Sutter | G06F 21/6227 |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,385,942 B2 * | 6/2008 | Brady | G06F 16/273 |
| | | | 370/316 |
| 7,454,580 B2 * | 11/2008 | Arimilli | G06F 9/3842 |
| | | | 711/129 |
| 7,636,724 B2 | 12/2009 | de la Torre et al. | |
| 7,653,136 B2 * | 1/2010 | Lobo | H04N 19/463 |
| | | | 19/463 |
| 7,694,191 B1 * | 4/2010 | Bono | G06F 11/004 |
| | | | 714/48 |
| 7,707,193 B2 * | 4/2010 | Zayas | G06F 16/10 |
| | | | 707/691 |
| 7,711,716 B2 * | 5/2010 | Stonecipher | G06F 16/2365 |
| | | | 707/691 |
| 7,774,322 B2 * | 8/2010 | Davis | G06F 16/10 |
| | | | 707/691 |
| 7,844,645 B2 * | 11/2010 | Davis | G06F 16/166 |
| | | | 707/822 |
| 7,979,402 B1 * | 7/2011 | Hamilton | G06F 16/128 |
| | | | 707/692 |
| 8,010,509 B1 * | 8/2011 | Khurana | G06F 11/2082 |
| | | | 707/690 |
| 8,082,235 B1 * | 12/2011 | Dasilva | G06F 16/783 |
| | | | 707/691 |
| 8,082,390 B1 * | 12/2011 | Fan | G06F 11/1092 |
| | | | 711/114 |
| 8,108,365 B2 * | 1/2012 | Mori | G06F 16/282 |
| | | | 707/690 |
| 8,126,848 B2 * | 2/2012 | Wagner | G06F 16/27 |
| | | | 707/648 |
| 8,209,363 B2 * | 6/2012 | Palthepu | G06F 16/182 |
| | | | 707/822 |
| 8,285,758 B1 * | 10/2012 | Bono | G06F 16/185 |
| | | | 707/822 |
| 9,996,413 B2 * | 6/2018 | Dhuse | G06F 11/1076 |
| 2002/0062422 A1 | 5/2002 | Butterworth et al. | |
| 2002/0138559 A1 * | 9/2002 | Ulrich | G06F 16/10 |
| | | | 709/203 |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0117718 A1 * | 6/2004 | Manasse | H03M 13/1515 |
| | | | 714/781 |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0055324 A1 * | 3/2005 | Godeby | G06Q 40/12 |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0095738 A1 * | 5/2006 | Akkary | G06F 9/3842 |
| | | | 712/219 |
| 2006/0136448 A1 | 6/2006 | Cialini et al. | |
| 2006/0136777 A1 * | 6/2006 | Terashita | G06F 11/1076 |
| | | | 714/6.12 |
| 2006/0156059 A1 | 7/2006 | Kitamura | |
| 2006/0168338 A1 * | 7/2006 | Bruegl | H04L 29/08729 |
| | | | 709/240 |
| 2006/0224603 A1 | 10/2006 | Correll | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2008/0126704 A1 * | 5/2008 | Ulrich | G06F 3/064 |
| | | | 711/114 |
| 2008/0183975 A1 * | 7/2008 | Foster | G06F 11/1096 |
| | | | 711/153 |
| 2009/0014218 A1 * | 1/2009 | Fuchs | H04L 1/0061 |
| | | | 178/2 B |
| 2009/0067495 A1 * | 3/2009 | Au | H04N 19/147 |
| | | | 375/240.12 |
| 2009/0094250 A1 * | 4/2009 | Dhuse | G06F 11/1004 |
| 2009/0094251 A1 | 4/2009 | Gladwin et al. | |
| 2009/0094318 A1 | 4/2009 | Gladwin et al. | |
| 2009/0182718 A1 * | 7/2009 | Waclawik | G06Q 30/0204 |
| 2009/0201949 A1 * | 8/2009 | Sunahara | H04N 21/4385 |
| | | | 370/474 |
| 2009/0210914 A1 * | 8/2009 | Suzuki | H04N 21/6587 |
| | | | 725/87 |
| 2009/0216910 A1 * | 8/2009 | Duchesneau | H04L 41/04 |
| | | | 709/250 |
| 2010/0023524 A1 | 1/2010 | Gladwin et al. | |
| 2010/0027679 A1 * | 2/2010 | Sunahara | H04N 19/64 |
| | | | 375/240.24 |
| 2010/0091659 A1 * | 4/2010 | O'Hanlon | H03M 13/09 |
| | | | 370/241 |
| 2010/0131474 A1 * | 5/2010 | Zayas | G06F 16/10 |
| | | | 707/691 |
| 2010/0228702 A1 * | 9/2010 | Davis | G06F 16/166 |
| | | | 707/691 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

(56) References Cited

OTHER PUBLICATIONS

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

* cited by examiner

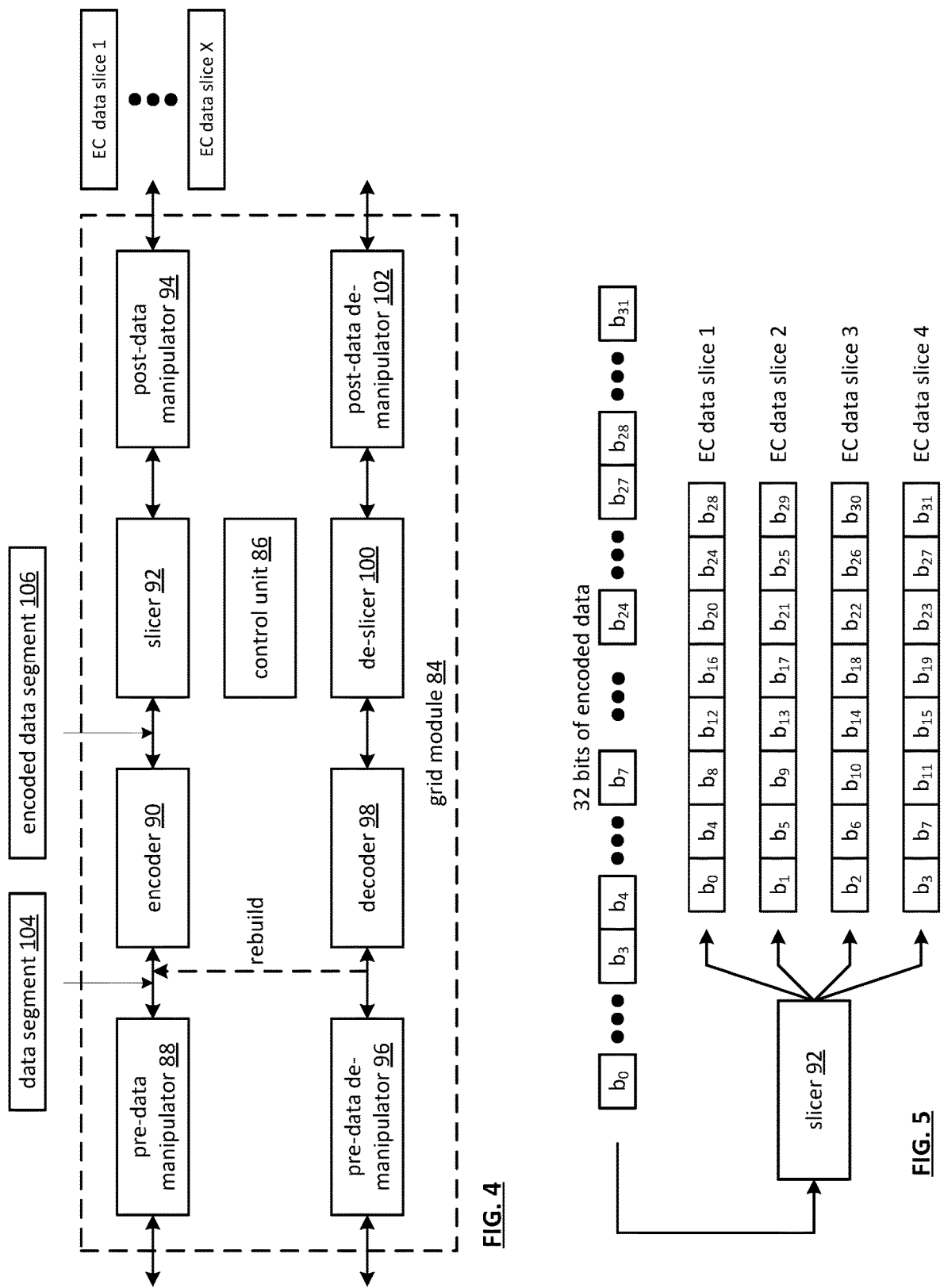

METHOD AND APPARATUS FOR IDENTIFYING DATA INCONSISTENCY IN A DISPERSED STORAGE NETWORK

CROSS REFERENCE TO RELATED PATENTS

The present U.S. Utility patent application claims priority pursuant to 35 U.S.C. § 120 as a continuation of U.S. Utility application Ser. No. 15/230,113, entitled "METHOD AND APPARATUS FOR IDENTIFYING DATA INCONSISTENCY IN A DISPERSED STORAGE NETWORK", filed Aug. 5, 2016, which is a continuation of U.S. Utility application Ser. No. 12/753,569, entitled "METHOD AND APPARATUS FOR IDENTIFYING DATA INCONSISTENCY IN A DISPERSED STORAGE NETWORK", filed Apr. 2, 2010, issued as U.S. Pat. No. 9,411,810 on Aug. 9, 2016, which claims priority pursuant to 35 U.S.C. § 119(e) to U.S. Provisional Application No. 61/237,650, entitled "DISPERSED STORAGE NETWORK DATA REBUILDING", filed Aug. 27, 2009, all of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing and more particularly to storage of information.

Description of Related Art

Computing systems are known to communicate, process, and store data. Such computing systems range from wireless smart phones to data centers that support millions of web searches, stock trades, or on-line purchases every day. Computing processing is known to manipulate data from one form into another. For instance, raw picture data from an image sensor may be compressed, or manipulated, in accordance with a picture compression standard to produce a standardized compressed picture that can be saved or shared with others. Computer processing capability continues to advance as processing speed advances and software applications that perform the manipulation become more sophisticated.

With the advances in computing processing speed and communication speed, computers manipulate real time media from voice to streaming high definition video. More general-purpose information appliances are replacing purpose-built communications devices, like the phone. For example, smart phones can support telephony communications but they are also capable of text messaging, and accessing the internet to perform functions including email, web browsing, remote applications access, and media communications. Media communications includes telephony voice, image transfer, music files, video files, real time video streaming and more.

Each type of computing system operates in accordance with one or more communication, processing, and storage standards. With such standards, and with advances in technology, more and more of the global information content is being converted into electronic formats. For example, more digital cameras are now being sold than film cameras, thus producing more digital pictures. High growth rates exist for web based programming that until recently was all broadcast by just a few over the air television stations and cable television providers. Digital content standards, such as those used in pictures, papers, books, video entertainment, home video, enable this global transformation to a digital format. Electronic content pervasiveness is producing increasing demands on the storage function of computing systems.

A typical computer storage function includes one or more memory devices to match the needs of the various operational aspects of the processing and communication functions. For example, a memory device may include solid-state NAND flash, random access memory (RAM), read only memory (ROM), a mechanical hard disk drive. Each type of memory device has a particular performance range and normalized cost. The computing system architecture optimizes the use of one or more types of memory devices to achieve the desired functional and performance goals of the computing system. Generally, the immediacy of access dictates what type of memory device is used. For example, RAM memory can be accessed in any random order with a constant response time. By contrast, memory device technologies that require physical movement such as magnetic discs, tapes, and optical discs, have a variable responses time as the physical movement can take longer than the data transfer.

Each type of computer storage system operates in accordance with one or more storage standards. For instance, computer storage systems may operate in accordance with one or more standards including, but not limited to network file system (NFS), flash file system (FFS), disk file system (DFS), small computer system interface (SCSI), internet small computer system interface (iSCSI), file transfer protocol (FTP), and web-based distributed authoring and versioning (WebDAV). An operating systems (OS) and storage standard may specify the data storage format and interface between the processing subsystem and the memory devices. The interface may specify a structure such as directories and files. Typically, a memory controller provides an interface function between the processing function and memory devices. As new storage systems are developed, the memory controller functional requirements may change to adapt to new standards.

Memory devices may fail, especially those that utilize technologies that require physical movement like a disc drive. For example, it is not uncommon for a disc drive to suffer from bit level corruption on a regular basis, or complete drive failure after an average of three years of use. One common solution is to utilize more costly disc drives that have higher quality internal components. Another solution is to utilize multiple levels of redundant disc drives to abate these issues by replicating the data into two or more copies. One such redundant drive approach is called redundant array of independent discs (RAID). Multiple physical discs comprise an array where parity data is added to the original data before storing across the array. The parity is calculated such that the failure of one or more discs will not result in the loss of the original data. The original data can be reconstructed from the other discs. RAID 5 uses three or more discs to protect data from the failure of any one disc. The parity and redundancy overhead reduces the capacity of what three independent discs can store. In RAID 5, the parity data overhead is 1/(n−1), where n is the number of disks. For example, the RAID 5 overhead is 50% in a three disk array. RAID 6 can recover from a loss of two discs and requires a minimum of four discs with an efficiency of (n−2)/n. Typical RAID systems utilize a RAID controller to encode and decode the data across the array.

Drawbacks of the RAID approach include effectiveness, efficiency and security. As more discs are added, the probability of one or two discs failing rises and is not negligible, especially if more desired less costly discs are used. When one disc fails, it should be immediately replaced and the data reconstructed before a second drive fails. To provide high reliability over a long time period, and if the RAID array is part of a national level computing system with occasional site outages, it is also common to mirror RAID arrays at different physical locations. This increase is data reliability, however, leads to a security issue by having whole copies of the same file stored at one storage system site or at multiple storage sites.

Therefore, a need exists to provide a data storage solution that provides more effective data reliability, minimizes adverse effects of multiple memory elements failures, provides improved security, can be adapted to a wide variety of storage system standards, and/or is compatible with computing and communications systems.

BRIEF DESCRIPTION OF THE SEVERAL VIEWS OF THE DRAWING(S)

FIG. 4 is a schematic block diagram of an embodiment of a grid module in accordance with the invention;

FIG. 5 is a diagram of an example embodiment of error coded data slice creation in accordance with the invention;

DETAILED DESCRIPTION OF THE INVENTION

Figure 1:
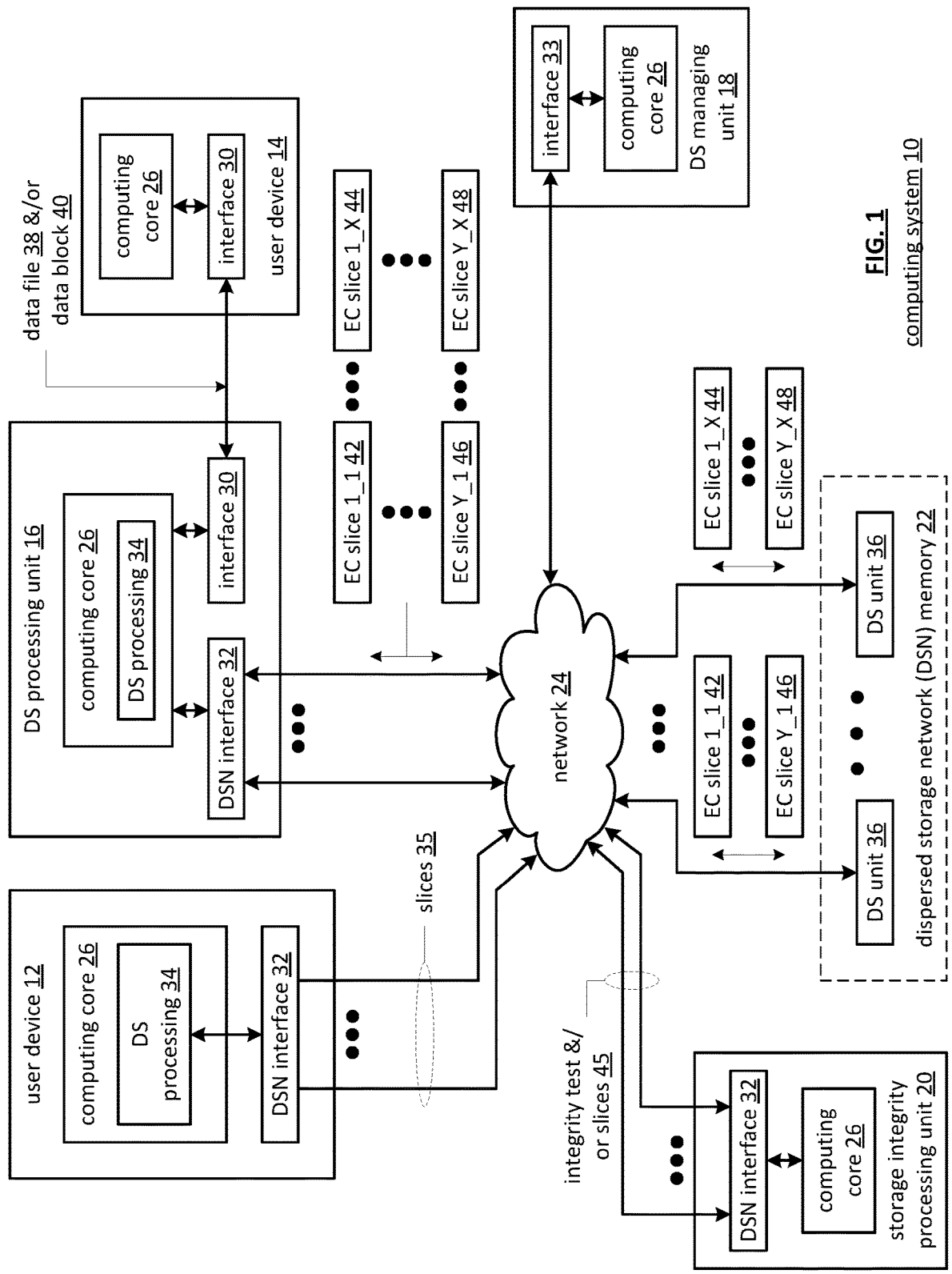
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-19.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs the distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a threshold value (e.g., the minimum number of slices required to reconstruct the data segment).

As another example, the DS managing unit 18 may create and store locally or within the DSN memory 22 user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 may create billing information for a particular user, user group, vault access, public vault access, etc. For instance, the DS managing unit 18 may track the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 may receive and aggregate network management alarms, alerts, errors, status information, performance information, and messages from the devices 12-14 and/or the units 16, 20, 22. For example, the DS managing unit 18 may receive a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 may determine that the DSN memory 22 needs more DS units 36 or that one or more of the DS units 36 needs updating.

The second primary function of distributed data storage and retrieval function begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon. The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., 21 to 2n bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, erasure coding, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-19.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 35 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In one instance, the storage integrity processing unit 20 periodically retrieves slices 45 of a data file or data block of a user device to verify that one or more slices has not been corrupted or lost (e.g., the DS unit failed). The retrieval process mimics the read process previously described. In another instance, the storage integrity processing unit 20 periodically retrieves integrity data of the slices 45 from the appropriate DS units 36. The storage integrity processing unit 20 interprets the integrity data to determine if one or more of the slices has a data inconsistency (e.g., is corrupted, out-of-date, missing, etc.).

If the storage integrity processing unit 20 determines that one or more slices has a data inconsistency, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

While the DS processing unit 16, the DS managing units 18, and the storage integrity processing unit 20 are shown as separate units, they may be functional units within one or more other components of the system 10. For example, the storage integrity processing unit 20 may be a distributed function contained with two or more of the DS units 36; may be a single unit within one of the DS units 36; may be within the DS managing unit 18; may be distributed within user devices (e.g., user devices 12-14) to verify the data of the corresponding user; and/or may be within the DS processing unit 16.

Figure 2:
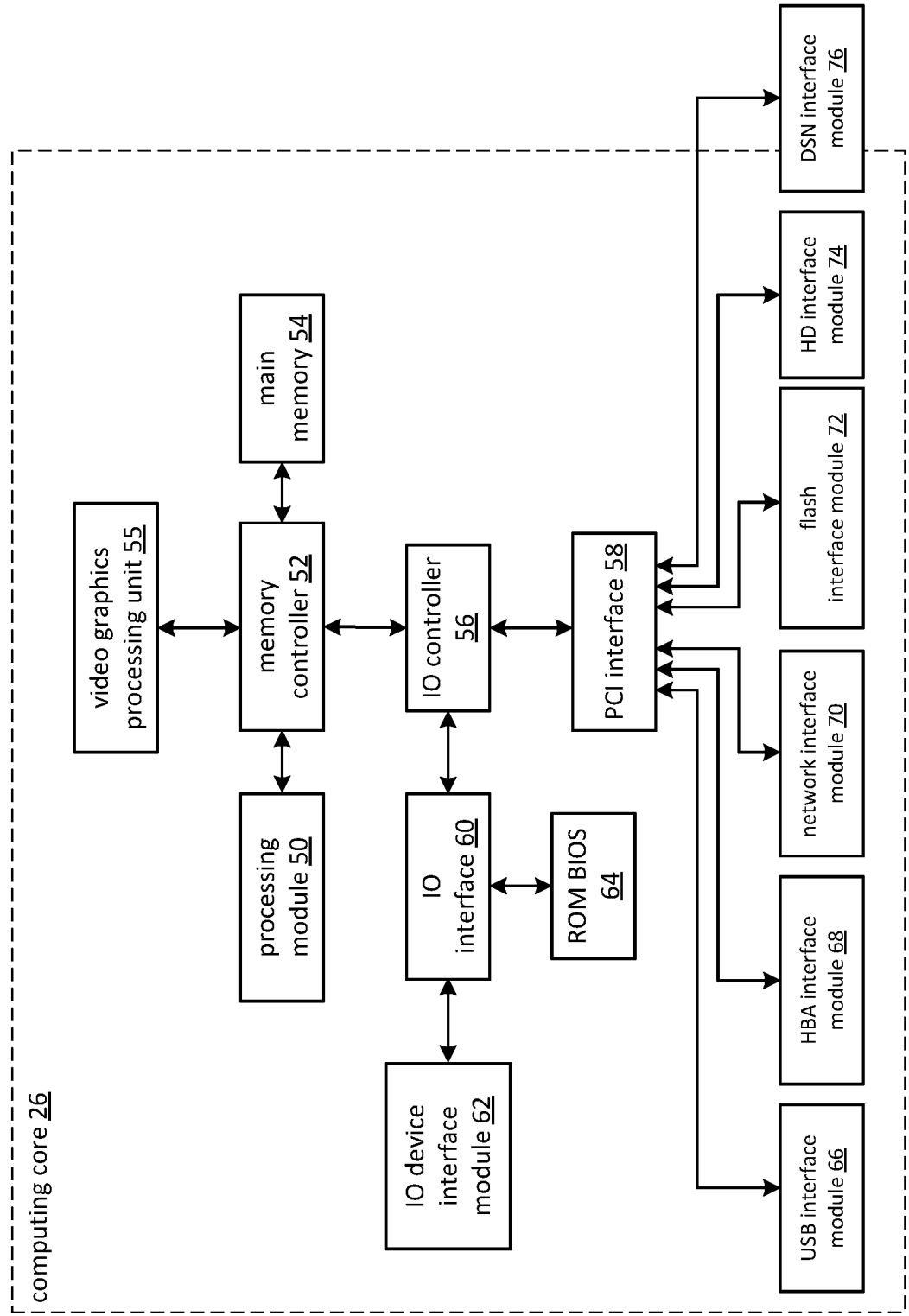
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-19.

Figure 3:
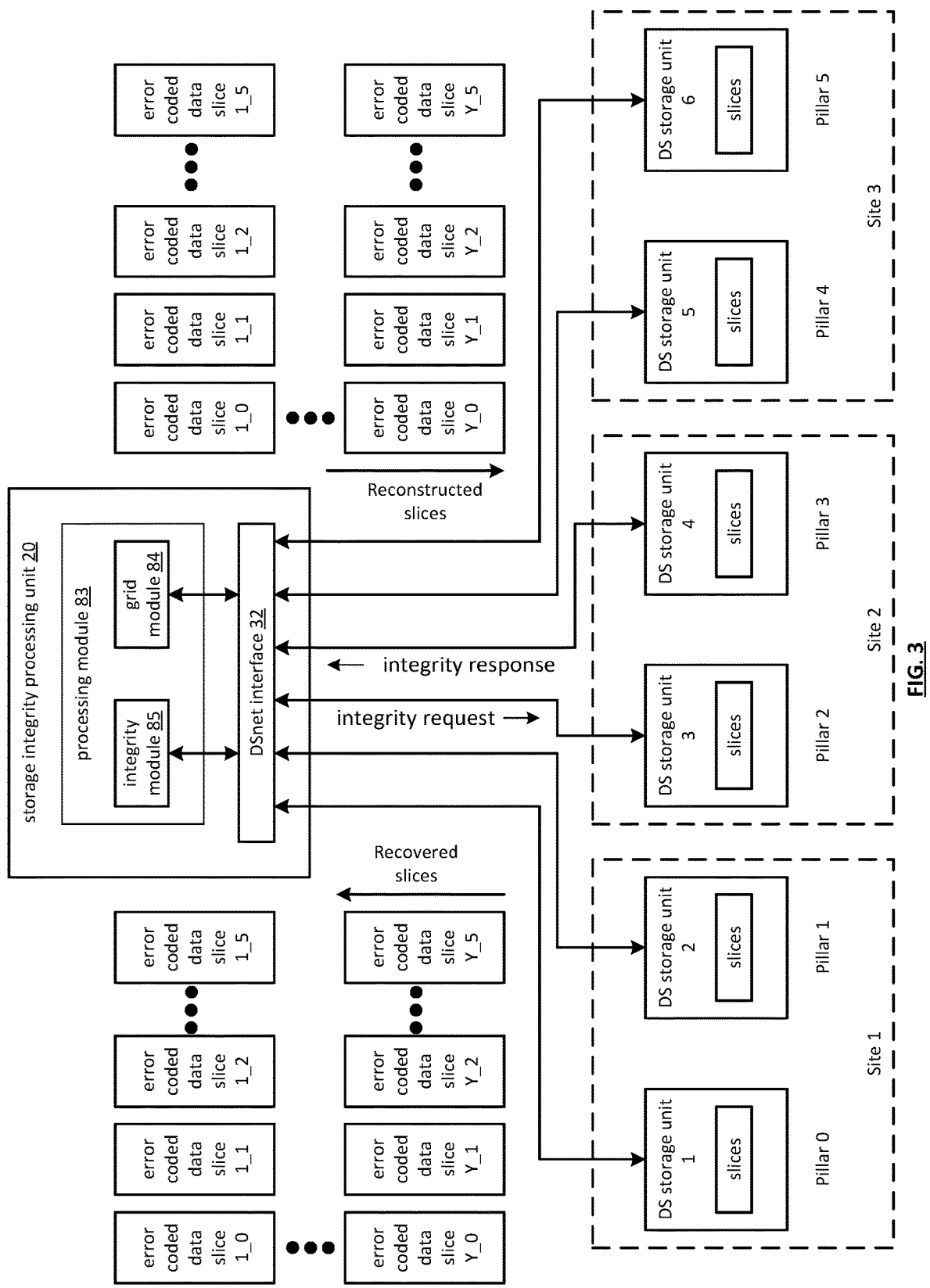
FIG. 3 is a schematic block diagram of an embodiment of a storage integrity processing unit in accordance with the invention.

FIG. 3 is a schematic block diagram of an embodiment of a storage integrity processing unit 20 that includes a processing module 50 of its computing core 26 and the DSnet interface 32. The processing module 50 may be configured to implement a grid module 84 and an integrity module 85. The DSnet interface 32 couples the processing module 50 to a plurality of DS storage units at one or more sites. In this example, six DS storage units (pillar 0-pillar 5) are located at three different sites; pillars 0-1 are located at site 1, pillars 2-3 are located at site 2, and pillars 4-5 are located at site 3.

In an example of operation, the integrity module 85 of the processing module 50 receives integrity data regarding one or more pluralities of data slices from the DS storage units 36. The DS storage units 36 may provide the integrity data in response to a request from the integrity module 85 and/or at predetermined intervals. In this example, a plurality of data slices corresponds to an error coded data segment such that the pluralities of data slices correspond to a plurality of error coded data segments. Note that a data segment may be of a fixed size (e.g., 1 MByte) or of a variable size and it may represent an entire, or portion of, a file or data object.

The integrity module 85 evaluates the plurality of received integrity data, which may be a cyclic redundancy check (CRC), hash value, etc. of the naming information and/or of the slices. When the evaluating of the plurality of received integrity data yields unfavorable results (e.g., one or more of the integrity data is not as expected (e.g., one of the slices names does not match the other slices names because a revision level is different; the naming information for one of the slices was not received; and/or the CRC of the naming information was not as expected)), the integrity module requests naming information of one or more pluralities of data slices from the plurality of DS storage units. Note that the naming information includes at least a portion of a slice name, wherein the slice name includes a source name (which is described with reference to one or more subsequent figures).

After receiving the naming information, the integrity module 85 evaluates it to identify at least one data slice of the one or more of pluralities of data slices having a data inconsistency (e.g., corrupt naming information, missing slice, out-of-date slice, etc.). For example, the integrity module 85 may evaluate the naming information by comparing one of the plurality of received naming information with at least some of the plurality of the received naming information to identify at least one data slice of the one or more of pluralities of data slices having a revision level data inconsistency. As another example, the integrity module 85 may evaluate the naming information by comparing one of the plurality of received naming information with at least some of the plurality of the received naming information to identify at least one data slice of the one or more of pluralities of data slices having a missing naming information data inconsistency. As yet another example, the integrity module 85 may evaluate the naming information by comparing one of the plurality of received naming information with at least some of the plurality of the received naming information to identify at least one data slice of the one or more of pluralities of data slices having a corrupted naming information data inconsistency.

When a data inconsistency is detected, the grid module 84 rebuilds the slice(s) having the data inconsistency. For instance, the grid module 84 may retrieve error coded data slices from the DS storage units and rebuild error coded data slices therefrom. Rebuilding of slices will be discussed in greater detail with reference to FIGS. 4 and 5.

FIG. 4 is a schematic block diagram of an embodiment of a grid module 84 that includes a control unit 86, a pre-data manipulator 88, an encoder 90, a slicer 92, a post-data manipulator 94, a pre-data de-manipulator 96, a decoder 98, a de-slicer 100, and a post-data de-manipulator 102. In another embodiment, the control unit 86 is partially or completely external to the grid module 84. For example, the control unit 86 may be part of the computing core at a remote location, part of a user device, part of the DS managing unit of FIG. 1, or distributed amongst one or more DS storage units.

The control unit 86 may assist and/or control the other elements of the grid module 84 to determine operational parameters that may include the types of pre-data and post-data manipulation/de-manipulation are to be applied to an incoming/outgoing data segments 104, if any, the type of error encoding/decoding to apply to the (encoded) data segments 106, and the slicing/de-slicing function. In addition, the control unit 86 may further create and maintain a DS storage memory mapping, status of DS storage units, performance history of DS storage units, capability of DS storage units, prioritization information for DS storage unit usage, and rebuilding criteria (e.g., when to rebuild, when to gather integrity information, etc.). The control unit 86 may determine the operational parameters by combining parameters of the associated vault with other parameters, which will be discussed below.

In an example of operation, the pre-data manipulator 88 receives the data segment 104 and a write instruction from an authorized user device. The control unit 86 or gateway module may assist the pre-data manipulator 88 to determine the vault for this user and the data segment 104. When enabled, the pre-data manipulator 88 determines if pre-manipulation of the data segment 104 is required, and if so, what type of pre-manipulation. The determination may be based on one or more factors including a computing system-wide predetermination, a table lookup, vault parameters associated with the user identification, the type of data, security requirements, available DSN memory, performance requirements, and/or other metadata.

The pre-data manipulator 88 manipulates the data segment 104 in accordance with the manipulation determination, which includes one or more of compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other manipulations to enhance the value of the data segment 104. Note that the pre-data de-manipulator 96 performs the complementary functions of the pre-data manipulator 88 when data is retrieved from the DSN memory. Note that the pre-data manipulator 88 and pre-data de-manipulator 96 are bypassed when data is recovered and reconstructed in the rebuild path.

The encoder 90 receives the data segment 104 from the pre-data manipulator 88 and encodes the data segment 104 using a forward error correction (FEC) encoder 90 to produce the encoded data segment 106. The encoder 90 determines what type of encoding algorithm to use based on factors including predetermination in the vault for this user and/or data segment 104, a time based algorithm, user directed, DS managing unit directed, as a function of the data type, as a function of the data segment 104 metadata, and/or any other factor to determine algorithm type. The encoder 90 may utilize a different encoding algorithm for each data segment 104, or the same encoding algorithm for all data segments 104, or some other combination. The encoder 90 may determine the encoding algorithm type to be one of Golay, Multidimensional parity, Reed-Solomon, Hamming, Bose Ray Chauduri Hocquenghem (BCH), Cauchy-Reed-Solomon, or any other FEC encoder. The encoded data segment 106 is of greater size than the data segment 104 by the overhead rate of the encoding algorithm. The encoded data segment 106 is d(X/T), where d is size of the data segment 104, X is the width n or number of slices, and T is the threshold or minimum number of received slices to enable recreation of the data segment 104.

The corresponding decoding process performed by decoder 98 can accurately recover the data segment provided it receives T or more slices. For example, if X=16 and T=10, then the data segment 104 will be recoverable, even if 6 EC data slices per segment are corrupted or missing. Note that the decoder 98 performs the complementary functions of the encoder 90 when data is retrieved from the DSN memory.

The slicer 92 receives the encoded data segment 106 from the encoder 90 and transforms the encoded data segment 106 into EC data slices in accordance with the slicing parameter from the vault for this user and/or data segment 104. In one embodiment, data segments 104 are packed one for one into a data slice. In this instance, it is possible to correct many data slices with this method if the error patterns are substantially manifested as individual bit errors. In another example of this instance, entire slices may be lost and hence entire data segments 104 may not be recoverable. In another embodiment, a data segment 104 is dispersed across many data slices (e.g., X wide pillars) to lessen the impact on a given data segment 104 when an entire data slice is lost. Less data per segment is lost, when a data slice is lost, as the data segment 104 is dispersed across more slices. The slicing is discussed in greater detail with reference to FIG. 5. Note that the de-slicer 100 performs the complementary functions of the slicer 92 when data is retrieved from the DSN memory.

The post-data manipulator 94 receives EC data slices from the slicer 92. The post-data manipulator 94 determines if post-manipulation of the EC data slices is required, and if so, what type of post-manipulation. The determination may be driven by one or more factors including a computing system-wide predetermination, parameters in the vault for this user, a table lookup, the user identification, the type of data, security requirements, available DSN memory, performance requirements, and/or other metadata. The post-data manipulator 94 manipulates the EC data slice in accordance with the manipulation determination. The manipulation may include one or more of slice level compression, signatures, encryption, CRC, addressing, watermarking, tagging, adding metadata, and/or other manipulation to improve the effectiveness of the computing system. The post-data manipulator 94 passes the resulting EC data slices, with the attached slice name, to the storage module for storage in the DSN memory. Note that the post-data de-manipulator 102 performs the complementary functions of the post-data manipulator 94 when data is retrieved from the DSN memory.

In an example of operation, the grid module 84 performs a rebuilder operation to repair a particular data segment 104 that has known missing, out-dated, and/or corrupted EC data slices. When one or more slices of a data segment are to be rebuilt, the grid module 84 retrieves at least T EC data slices (e.g., T=read threshold) of slices of the data segment that do not have a data inconsistency. In addition, the grid module 84 may retrieve vault parameters based on a vault identifier contained in the slice name, wherein the vault parameters include information regarding the type of post-data manipulation, the slicing/de-slicing function, and the encoding/decoding function. Based on these parameters, the retrieved slices are post-data de-manipulated, de-sliced, and decoded to produce a reconstructed data segment. The reconstructed data segment is then encoded, sliced, and post-data manipulated to produce a plurality of rebuilt data slices that are sent to the DS storage units 36 for storage.

FIG. 5 is a diagram of an example embodiment of error coded data slice creation where the slicer creates four EC data slices from a thirty-two bit encoded data segment. The slicer disperses the bits from the encoded data segment across the EC data slices wrapping around from the last slice to the first slice over and over (i.e., interleaves the bits among the slices). Each EC data slice, for this data segment, is stored on a different DS storage unit. In this example, encoded data segment bits 0, 4, 8, 12, 16, 20, 24, and 28 form EC data slice 1; encoded data segment bits 1, 5, 9, 13, 17, 25, and 29 form EC data slice 2; encoded data segment bits 2, 6, 10, 14, 18, 22, 26, and 30 form EC data slice 3; and encoded data segment bits 3, 7, 11, 15, 19, 23, 27, and 31 form EC data slice 4. In a 4/3 system (a width of 4 pillars and a read threshold of 3), one EC data slice can be lost and the data segment can still be accurately recovered. Note that more slices produce a larger distance between consecutive encoded data segment bits of a slice, which improves the error resiliency.

Figure 6:
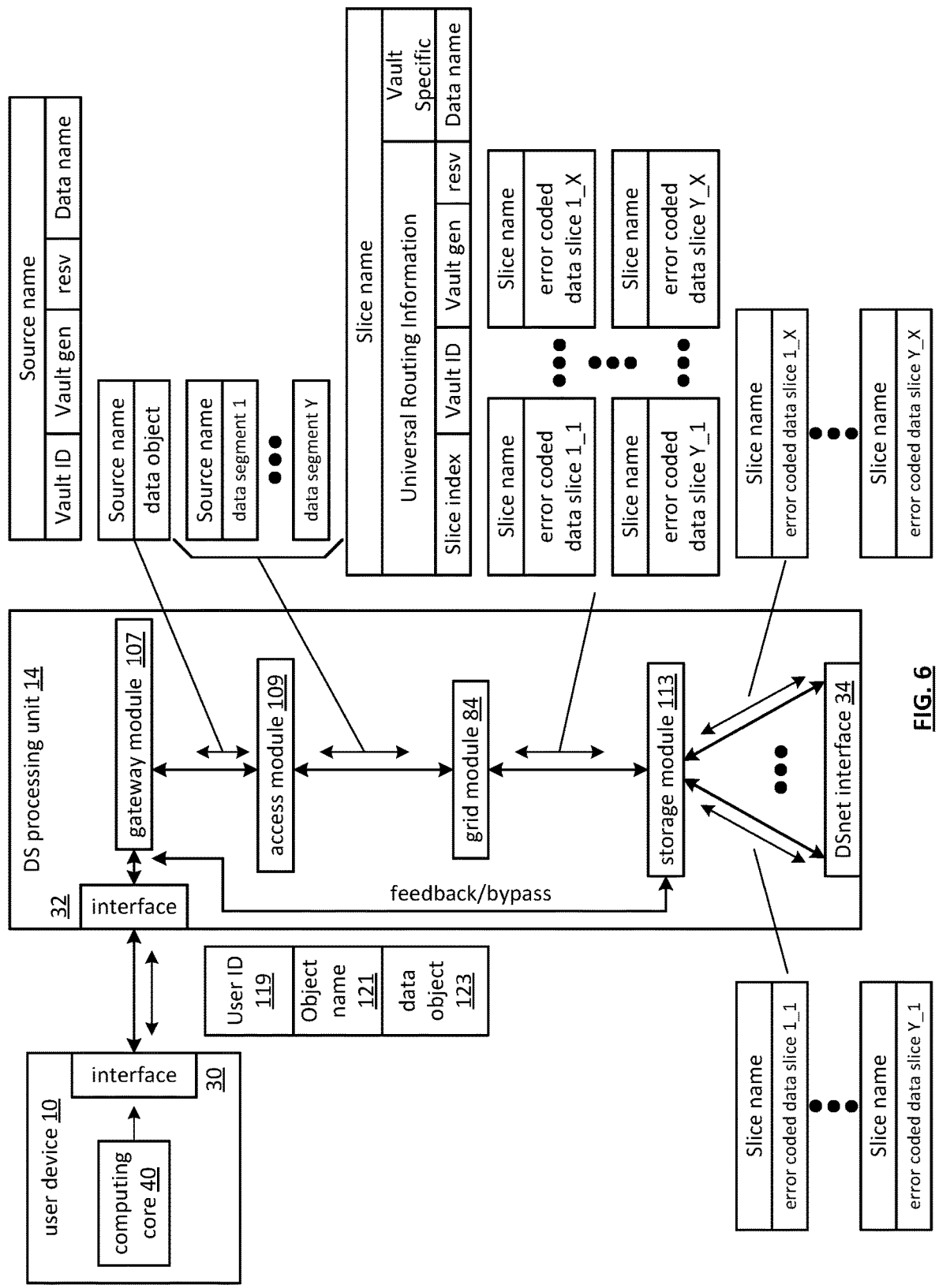
FIG. 6 is a schematic block diagram of an embodiment of a dispersed storage processing unit in accordance with the invention.

FIG. 6 is a schematic block diagram of an embodiment of a dispersed storage (DS) processing module 34 of user device 12 and/or of the DS processing unit 16. The DS processing module 34 includes a gateway module 107, an access module 109, a grid module 84, a storage module 113, and a bypass/feedback path. The DS processing module 34 may also include an interface 70 (e.g., interface 28) and the DSnet interface 68 or the interfaces 68 and/or 70 may be part of user 12 or of the DS processing unit 16.

In an example of storing data, the gateway module 107 of the DS processing module 34 receives an incoming data object (e.g., a data file, a data block, an EC data slice, etc.), authenticates the user associated with the data object, obtains user information of the authenticated user, and assigns a source name to the data object in accordance with the user information. To authenticate the user, the gateway module 107 verifies the user ID 119 with the managing unit 18 and/or another authenticating unit. If the user ID is verified, the gateway module 107 retrieves the user information from the managing unit 18, the user device, and/or the other authenticating unit based on the user ID.

The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, an encryption algorithm, a slicing parameter, a compression algorithm, an integrity check method, caching settings, parallelism settings, and/or other parameters that may be used to access the DSN memory layer.

The gateway module 107 determines the source name to associate with the data object based on the vault identifier and the data object. For example, the source name may contain a data name (block number or a file number), the vault generation number, a reserved field, and a vault identifier. The data name may be randomly assigned but is associated with the user data object.

The gateway module 107 may utilize the bypass/feedback path to transfer an incoming EC data slice to another DS storage unit 36 when the DS processing module 34 determines that the EC data should be transferred. Alternatively, or in addition to, the gateway module 107 may use the bypass/feedback path to feedback an EC slice for sub-slicing.

The access module 109 receives the data object and creates a series of data segments 1 through Y therefrom. The number of segments Y may be chosen or random based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the source name.

The grid module 84, as previously discussed, may pre-manipulate (e.g., compression, encryption, cyclic redundancy check (CRC), etc.) the data segment before creating X error coded data slices for each data segment. The grid module 84 creates XY error coded data slices for the Y data segments of the data object. The grid module 84 adds forward error correction bits to the data segment bits in accordance with an error coding algorithm (e.g., Reed-Solomon, Convolution encoding, Trellis encoding, etc.) to produce an encoded data segment. The grid module 84 determines the slice name and attaches the unique slice name to each EC data slice.

The number of pillars, or slices X per data segment (e.g., X=16) is chosen as a function of the error coding objectives. The DS processing module may utilize different error coding parameters for EC data slices and EC data sub-slices based on guidance from one or more of a user vault (e.g., stored parameters for this user), a command from the DS managing unit or other system element, priority of the EC data slice, type of data in the EC data slice, and/or retrieval speed requirements. A read threshold T (e.g., T=10) of the error coding algorithm is the minimum number of error-free error coded data slices required to be able to reconstruct a data segment. The DS processing unit can compensate for X-T (e.g., 16−10=6) missing, out-of-date, and/or corrupted error coded data slices per data segment.

The grid module 84 receives each data segment 1-Y and, for each data segment generates X number of error coded (EC) slices using an error coding function. The grid module 84 also determines the DS storage units 36 for storing the EC data slices based on a dispersed storage memory mapping associated with the user's vault and/or DS storage unit 36 attributes, which include availability, self-selection, performance history, link speed, link latency, ownership, available DSN memory, domain, cost, a prioritization scheme, a centralized selection message from another source, a lookup table, data ownership, and/or any other factor to optimize the operation of the computing system.

The storage module 113 may perform integrity checks on the EC data slices and then transmit the EC data slices 1 through X of each segment 1 through Y to the DS storage units. The DS storage units 36 may store the EC data slices and locally keep a table to convert virtual DSN addresses into physical storage addresses. Note that the number of DS storage units 36 is equal to or greater than the number of pillars (slices X per segment) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

In an example of a read operation, the user device 10 or 12 sends a read request to the DS processing unit 14, which authenticates the request. When the request is authentic, the DS processing unit 14 sends a read message to each of the DS storage units 36 storing slices of the data object being read. The slices are received via the DSnet interface 34 and processed by the storage module 113, which performs a parity check and provides the slices to the grid module 84. The grid module 84 de-slices and decodes the slices of a data segment to reconstruct the data segment. The access module reconstructs the data object from the data segments and the gateway module 107 formats the data object for transmission to the user device.

Figure 7:
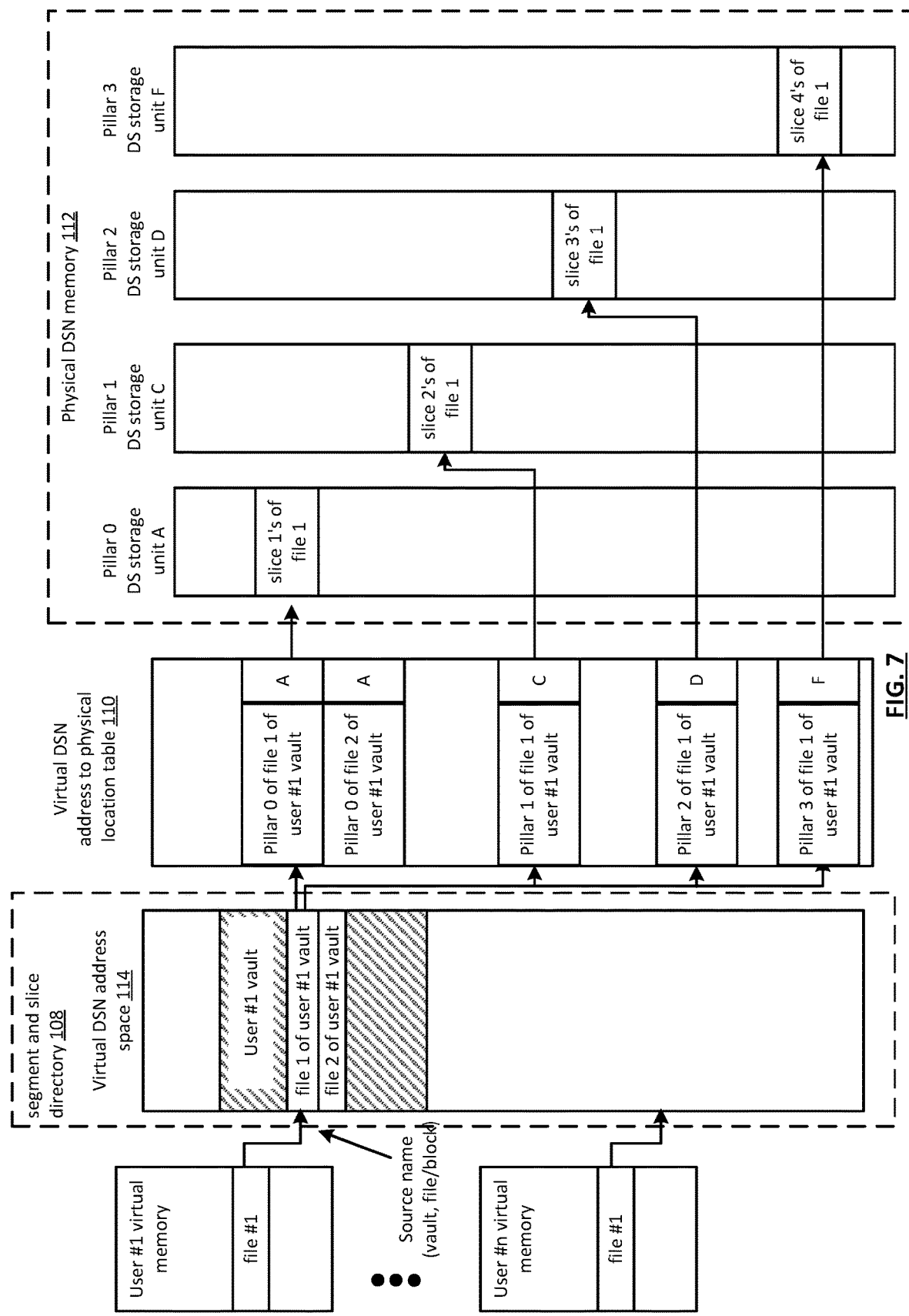
FIG. 7 is a schematic block diagram of an embodiment of a file system hierarchy in accordance with the invention.

FIG. 7 is a schematic block diagram of an embodiment of a file system hierarchy including a plurality of user virtual memories, a segment and slice directory 108, a virtual dispersed storage network (DSN) address to physical location table 110, and a physical dispersed storage network (DSN) memory 112. The file system hierarchy may be utilized to translate the user virtual memory system to the physical DSN memory 112 by translating the user virtual memory address into a virtual dispersed storage network (DSN) address space 114 and then to the physical DSN memory 112. The segment and slice directory 108 includes the virtual DSN address space 114 and the physical DSN memory 112 includes a plurality of DS storage units (e.g., A, C, D, and F). In an example, where there are four pillars, there are four slices created for each of the Y data segments. Pillars can be allocated to more than one DS storage unit, but a given DS storage unit is not assigned to store more than one pillar from a given user (or vault) to improve system robustness (e.g., avoiding loss of multiple slices as a result of a single DS storage unit failure).

In an embodiment, one of the plurality of user virtual memories utilizes a native OS file system to access the segment and slice directory 108 by including source name information in requests such as read, write, delete, list, etc. A source name vault identifier and a file/block name may index into the segment and slice directory 108 to determine the virtual DSN address space 114. A unique virtual vault is associated with each user (e.g., an individual, a group of individuals, a business entity, a group of business entities, etc.) and may contain user attributes (e.g., user identification, billing data, etc.), operational parameters, and a list of the DS storage units that may be utilized to support the user.

One or more vaults may be established from the same set of DS storage units in different combinations. A vault identifier is utilized to distinguish between vaults. For example, vault #1 (for user 1) may utilize DS storage units A, C, D, and F (X=4 wide) while vault #2 (user 2) may utilize DS storage units A-H (X=8 wide) (note that DS units B, E, G, and H are not shown).

In an example, the total virtual DSN address space 114 is defined by a forty-eight byte identifier thus creating 25648 possible slice names. The virtual DSN address space 114 accommodates addressing of EC data slices corresponding to segments of data objects (e.g., data file, blocks, streams) over various generations and vaults. The slice name is a virtual DSN address and remains the same even as different DS storage units are added or deleted from the physical DSN memory 112.

A user has a range of virtual DSN address assigned to their vault. For instance, the virtual DSN addresses typically do not change over the operational lifespan of the system for the user. In another instance, the virtual DSN address space 114 is dynamically altered from time to time to provide such benefits as improved security and expansion, retraction, and/or capability. A virtual DSN address space 114 security algorithm may alter the virtual DSN address space 114 according to one or more of a command (e.g., from the DS managing unit), a schedule, a detected security breach, or any other trigger. The virtual DSN address may also be encrypted in use thus requiring encryption and decryption steps whenever the virtual DSN address is used.

The vault and file name index used to access the virtual DSN address space 114 and to create the slice names (virtual DSN addresses) may also be used as an index to access the virtual DSN address to physical location table 110. For example, the virtual DSN address to physical location table 110 is sorted by vaults and pillars so that subsequent addresses are organized by pillar of the file segments that have EC data slices with the same slice identifier and hence are typically stored at the same DS storage unit (e.g., slices having a first pillar identifier are stored in DS storage unit A). The output of the access to the virtual DSN address to physical location table 110 is the DS storage unit identifiers.

The slice names may be used as the virtual index to the memory system of each DS storage unit to gain access the physical location of the EC data slices. In this instance, the DS storage unit maintains a local table correlating slice names (virtual DSN address) to the addresses of the physical media internal to the DS storage unit. For example, user number 1 has a vault identified operational parameter of four pillars and pillar 0 is mapped to DS storage unit A, pillar 1 is mapped to DS storage unit C, pillar 2 is mapped to DS storage unit D, and pillar 3 is mapped to DS storage unit F.

Figure 8:
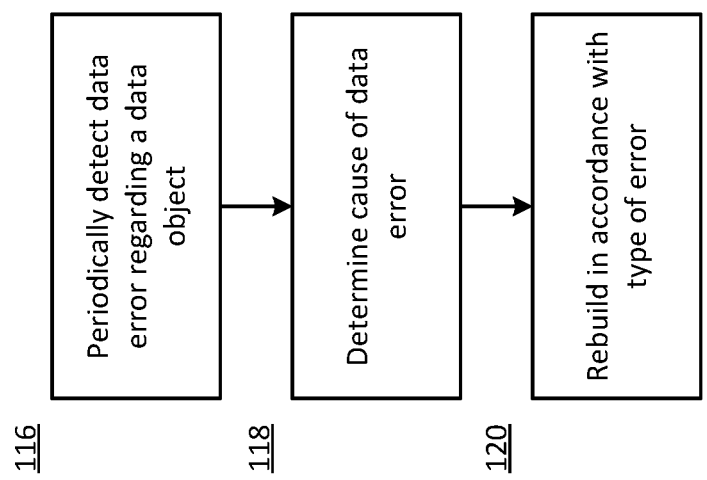
FIG. 8 is a logic diagram of an embodiment of a method for data rebuilding in accordance with the present invention.

FIG. 8 is a logic diagram of an embodiment of a method for data rebuilding where the grid module periodically scans EC data slices to detect data errors regarding a data object 116. The grid module scanning function may be centralized or it may be distributed among other system elements (e.g., to reduce network traffic) including one or more of the storage integrity processing unit, the DS storage unit, the DS managing unit, the DS processing unit, or the user device.

The grid module determines the cause or type of data error 118. The scanning may detect data errors including one or more of but not limited to a slice failure, wrong version slices resulting from a failure during a storage sequence, a DS storage unit failure, and/or a site failure. For example, if the network is down to the site, a site failure may be detected. The method of detecting the data error types is further discussed with reference to one or more of FIGS. 9-19.

The grid module may rebuild the affected data slices in accordance with the type of error 120. For example, if the data error is the missing slice, then the missing slice is reconstructed and stored based on the slices still online for the corresponding data segment. In another example, if the data error type is the site failure, then the data slices may be reconstructed and stored when the site is back up (e.g., the original DS storage unit is active again) or the data slices may be reconstructed and stored on a different currently active DS storage unit if a predetermined amount of time has passed since the data error was detected and the original DS storage unit is not back online. The rebuilding of the data slices in accordance with the type of error is discussed further with reference to one or more of FIGS. 9-19.

Figure 9:
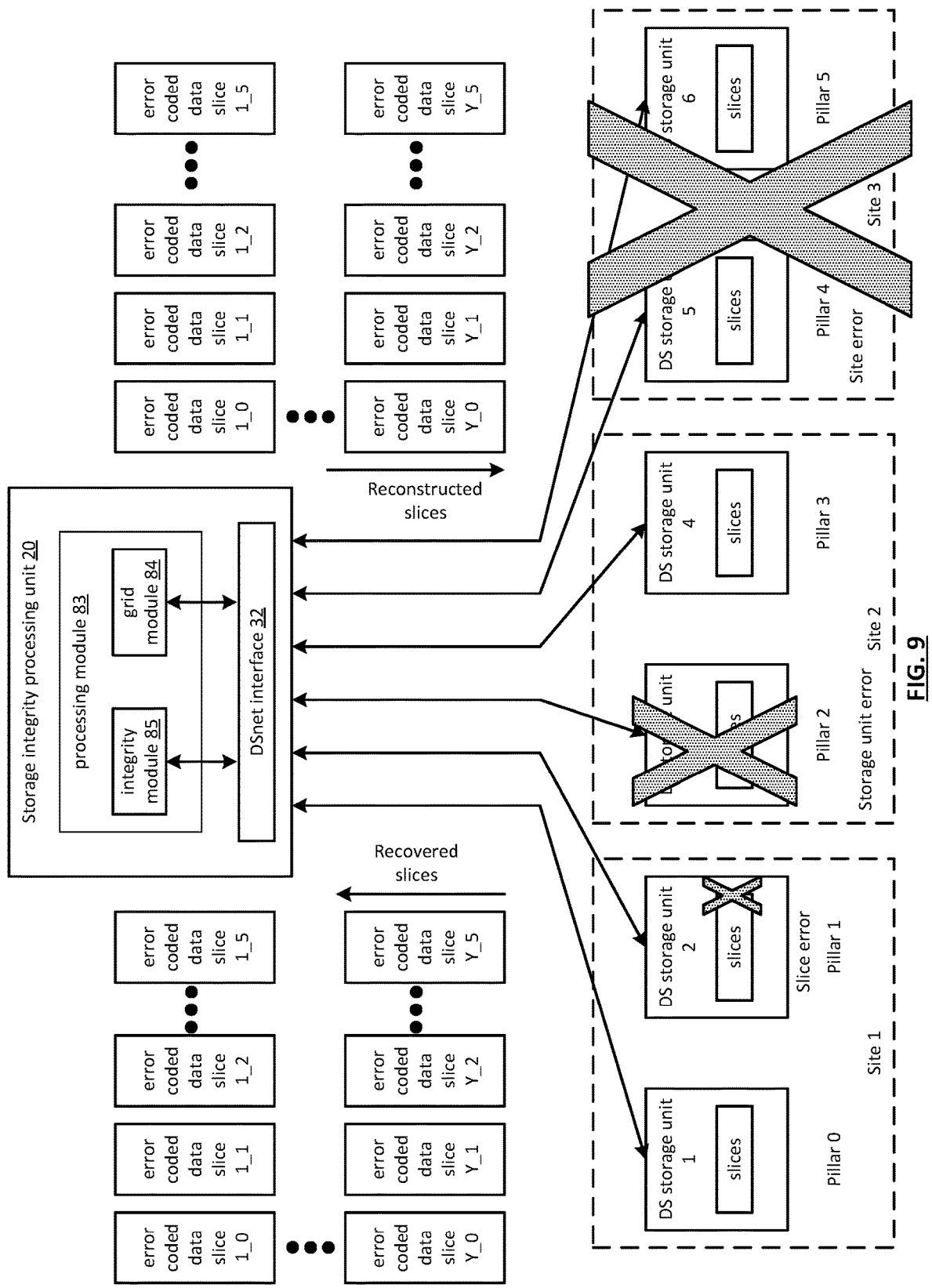
FIG. 9 is a schematic block diagram of another embodiment of a storage integrity processing unit in accordance with the invention.

FIG. 9 is a schematic block diagram of another embodiment of a storage integrity processing unit 20 that the processing module 83 and a DSnet interface 32. The processing module 83 may implement the grid module 84 and the integrity module 85. To detect for slices having a data inconsistency, the grid module 84 scans the EC data slices stored at the DS storage unit. For example, the grid module 84 may scan six pillars of EC data slices for segments 1 to Y of a data object.

The grid module 84 may detect three major types of data errors: slice failure, storage unit failure, and site failure. For a slice failure (illustrated at DS storage unit 2), the grid module 84 rebuilds the slice as previously discussed.

For a DS storage unit failure (illustrated at DS storage unit 3), the grid module 84 may take action to rebuild the slices stored within the DS storage unit and store the rebuilt slices in another DS storage unit. The decision to rebuild the data slices stored at the failed DS storage unit may be delayed until a predetermined period of time has passed, which is based on an estimate for bringing the failed DS storage unit back on line.

For a site failure where one or more DS storage units operate (illustrated at site 3 where DS storage units 5 and 6 may be offline), the grid module 84 rebuilds the data slices stored at the site and stores the rebuilt slices at a new site. Depending on the number of DS storage units at a site in comparison to the number of recoverable errors (e.g., width [X]-read threshold [T]), the rebuilding may be immediately done or delayed in the hope that the site will come back on line. In the example of FIG. 9, the rebuilding would begin immediately upon detecting the site failure since the site contains two of the six pillars in a 6/4 system and any further loss of slices at another site would render the data segment unreadable.

Figure 10:
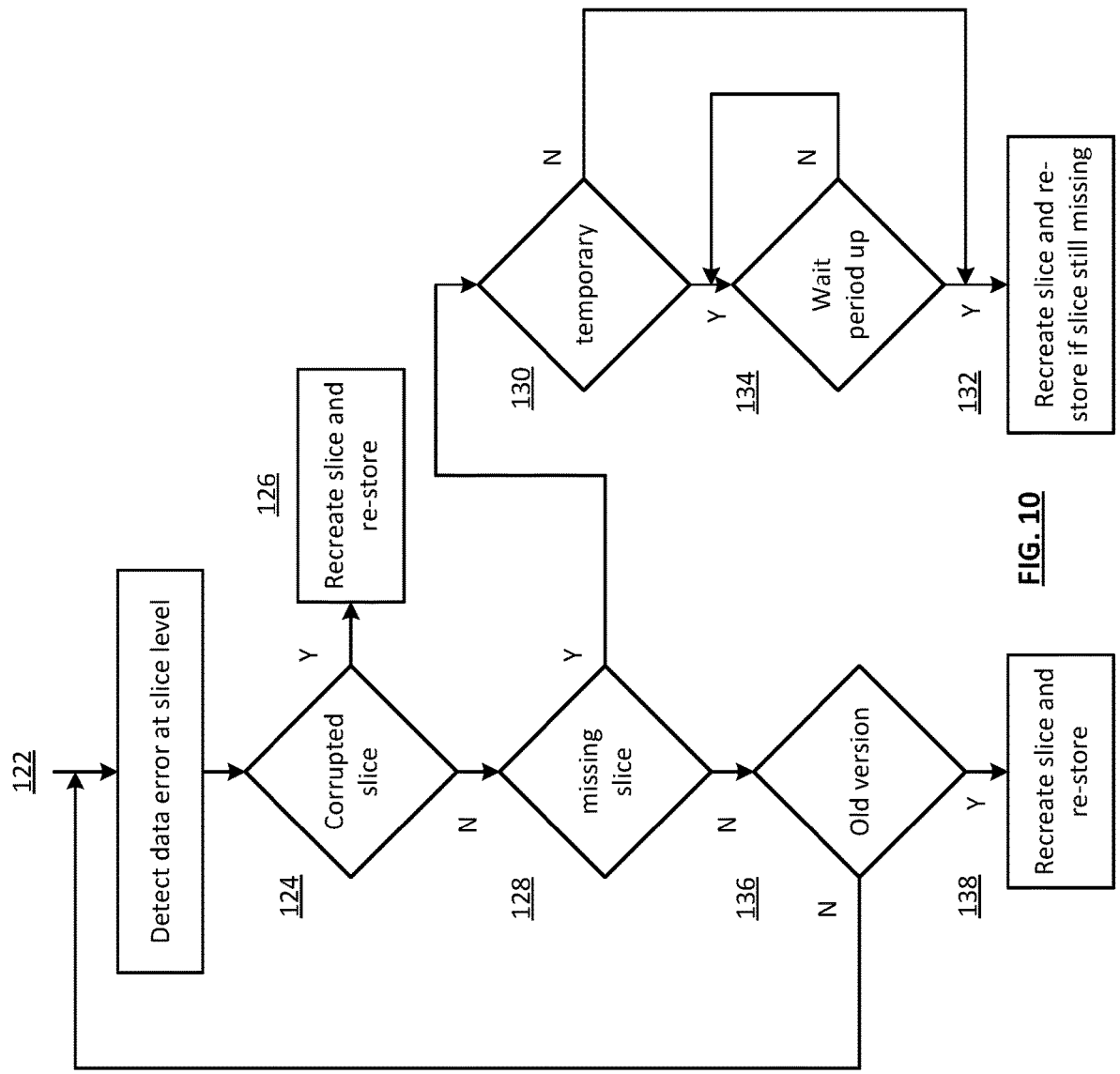
FIG. 10 is a logic diagram of another embodiment of a method for data rebuilding in accordance with the present invention.

FIG. 10 is a logic diagram of another embodiment of a method for data rebuilding where the grid module periodically attempts to detect a data error at the slice level 122. The slice errors may involve just one slice or a plurality of the same pillar slices for more than one data segment. The slice error may result from a corrupted slice, from a missing slice, or from an out-dated slice (e.g., failed to successfully store a more recent version).

As an example of detecting a slice error, the grid module receives integrity data regarding slice names from the DS storage units for a data segment or a plurality of data segments. The grid module compares the integrity data and, when it does not substantially match, it flags a slice error. The integrity data from a single DS storage unit may be a CRC, a hash, a parity check or other data validity function for a slice name or a list of slice names of a vault the DS storage unit is supporting. In general, the integrity data will be smaller than the slice name(s) it represents, thus requiring less network bandwidth to identify slice errors (e.g., slices with data inconsistencies).

The method continues at step 124 where the grid module determines whether the slice error is a result of a corrupted slice, which may be done by calculating a CRC for the slice and comparing it to a known valid CRC. If the slice error is a corrupted slice, the method continues at step 126 where the grid module rebuilds the corrupted slice of a data segment from the other slices of the data segment and re-stores the rebuilt slice on the same DS storage unit.

If the slice error is not result of a corrupted slice, the method continues to step 128 where the grid module determines whether the slice is missing. For example, the grid module received less than all of the expected number of slices for a data segment. If the slice is missing, the method continues at step 130 where the grid module determines whether the missing slice is a temporary condition. The determination may be based on a maintenance indicator (e.g., the DS storage unit is temporarily down for updates or repair), or a network connectivity indicator (e.g., the network is temporarily down to the DS storage unit).

If the missing slice is a temporary condition, the method continues at step 134 where the grid module waits for the cause for the temporary condition to be resolved. If resolved within a predetermined period of time, the process is complete for this particular slice error. If, however, the predetermined period of time expires prior to the temporary condition being resolved or it is not a temporary condition, the method proceeds to step 132 where the grid module rebuilds (e.g., recreates) the missing slice and re-stores it on another DS storage unit If the slice error is not a missing slice, the method continues to step 136 where the grid module determines whether the slice version is old (e.g., the slice is out-of-date). The determination may be made by comparing the version of the other slices for the same segment or by looking up the version in the user vault for the slice name. If it is not an older version, the method repeats at step 122. If, however, it is an old version, the method continues at step 138 where the grid module rebuilds the slice and re-stores it on the same or a different DS storage unit.

Figure 11:
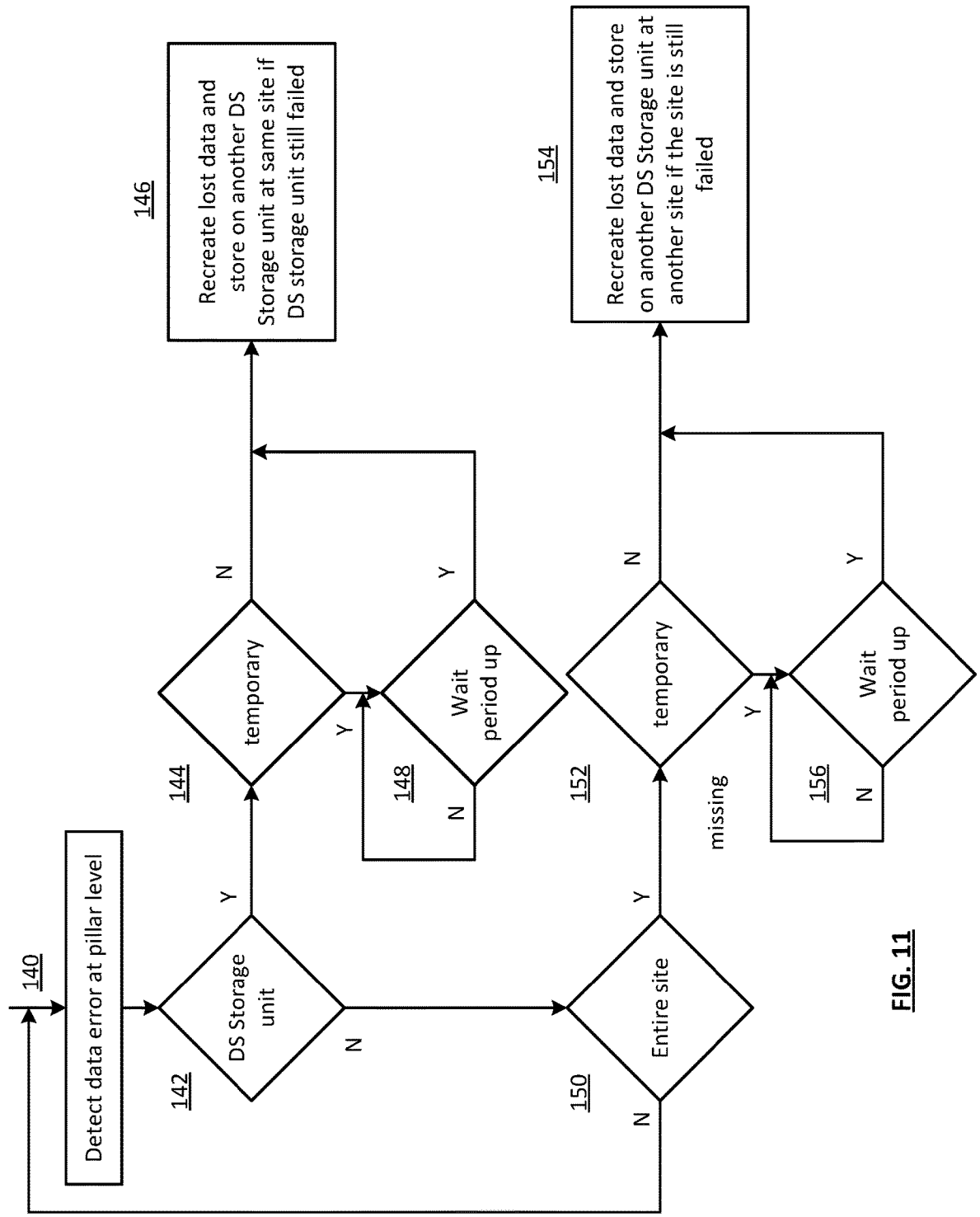
FIG. 11 is a logic diagram of another embodiment of a method for data rebuilding in accordance with the present invention.

FIG. 11 is a logic diagram of another embodiment of a method for data rebuilding that begins at step 140 where the grid module periodically attempts to detect a data error at the pillar level (e.g., a DS storage unit failure and/or a site failure causing multiple DS storage unit failures). The method continues at step 142 where the grid module determines whether a DS storage unit failure has occurred. Such a determination may be based on one or more of: numerous EC data slice errors, no response (e.g., powered off, network down, equipment failure, etc.), a scheduled DS storage unit outage (e.g., for testing rebuild function, for maintenance on the DS storage unit, etc.), and/or numerous missing EC data slices.

If a DS storage unit failure is detected, the method continues at step 144 where the grid module determines whether the failure is due to a temporary condition. For example, the grid module may receive a maintenance indicator (e.g., the DS storage unit is temporarily down for updates or repair) and/or a network connectivity indicator (e.g., the network is temporarily down to the DS storage unit). If the failure is due to a temporary condition, the method continues at step 148 where the grid module waits for the temporary condition to be resolved. If the temporary failure condition is not resolved in a predetermined time or the failure is not due to a temporary condition, the method continues at step 146 where the grid module may rebuild the lost EC data slices of the DS storage unit and stores them on another DS storage unit, which may be at the same site or a different site of the failed DS storage unit.

If a DS storage unit failure is not detected, the method continues at step 150 where the grid module determines whether a site failure has occurred. If not, the process repeats. If a site failure is detected, the method continues at step 152 where the grid module determines whether the site failure is due to a temporary condition (e.g., down for maintenance, down for updates, network is temporarily down, or is a scheduled outage). If the failure is due to a temporary condition, the method continues at step 156 where the grid module waits for the temporary condition to be resolved. If the temporary failure condition is not resolved in a predetermined time or the failure is not due to a temporary condition, the method continues at step 154 where the grid module may rebuild the lost EC data slices of the site and stores them at another site.

Figure 12:
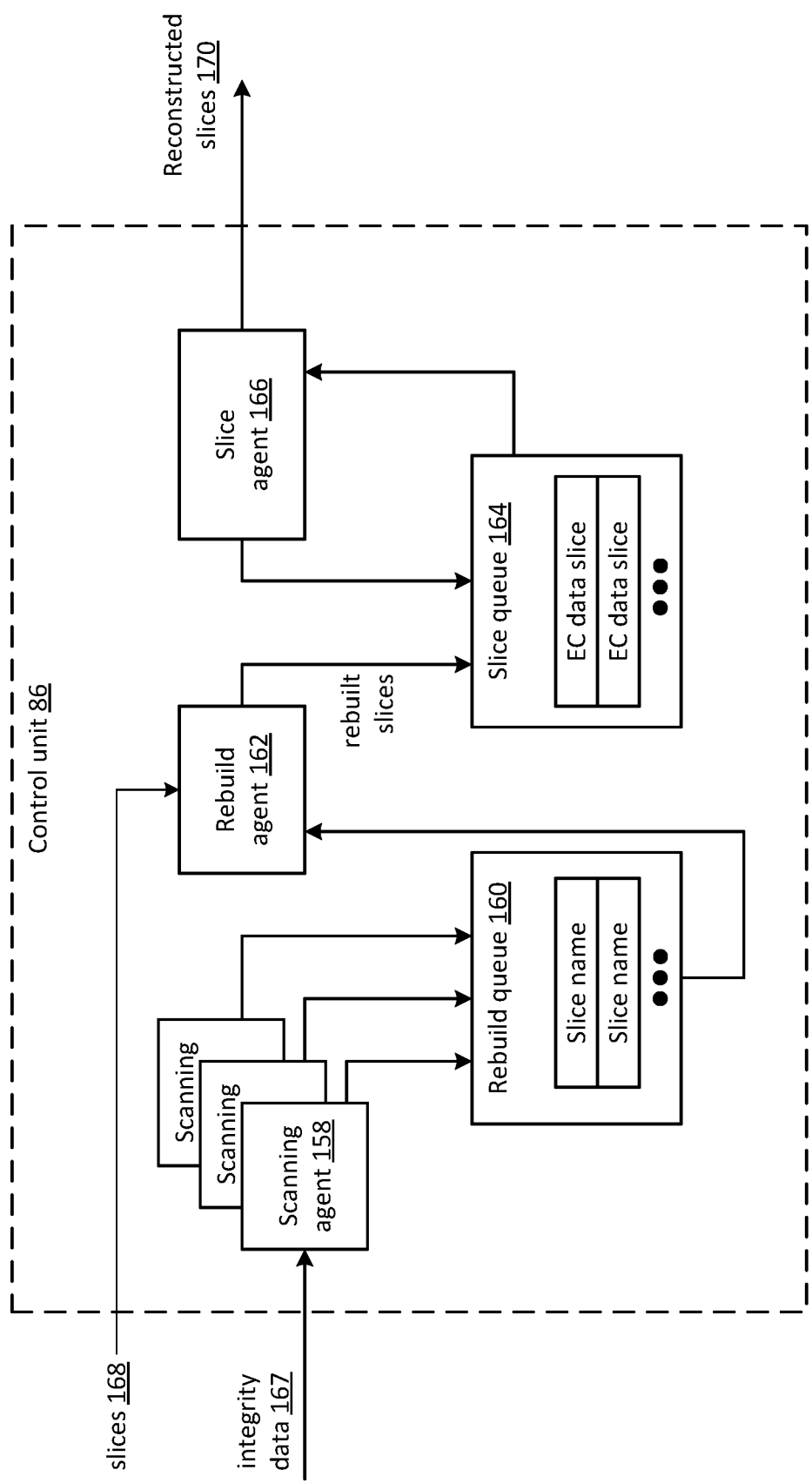
FIG. 12 is a schematic block diagram of an embodiment of a control unit in accordance with the invention.

FIG. 12 is a schematic block diagram of an embodiment of a control unit 86 (of the grid module 84) that includes one or more scanning agents 158, a rebuild queue 160, a rebuild agent 162, a slice queue 164 and a slice agent 166. For efficient rebuild scanning, the number of scanning agents is somewhat dependent on the size of the virtual DSN addressing space. For instance, if the DSN addressing space is relatively small, then a single scanning agent 158 may be sufficient to communicate with the DS storage units to identify slices that need rebuilding. As the DSN address space increases, it may be more efficient to divide the DSN addressing space among two or more of the scanning agents 158, where a scanning agent communicates with DS storage units associated with its range of the DSN addressing space.

In an example of operation, a scanning agent communicates with the DS storage units associated with its portion of the DSN addressing space to receive integrity data 167 as previously discussed. If the scanning agent 158 detects an error, it places the slice name of a slice with data errors into the rebuild queue 160.

The rebuild agent 162 retrieves slice names from the rebuild queue 160 to initiate the rebuilding process in an ordered manner, which may be a first in first out (FIFO) or it may be based on a prioritization algorithm. The prioritization algorithm may operate to speed the recovery of key missing data slices and/or may be based on a priority indicator for the data object, a priority indicator for the user, a priority indicator for the data object type (e.g., always recover banking records ahead of home video), slice age (e.g., which is the most outdated), and/or any other priority indicator to provide timely recovery of the most crucial and/or valuable data.

The rebuild agent 162 retrieves data slices (e.g., from the other pillars not having a slice error) based on the stored slice name and rebuilds the data slices therefrom as previously discussed. The slice queue 164 stores the rebuilt slices the until the slice agent 166 can write them to the DS storage units.

Figure 13:
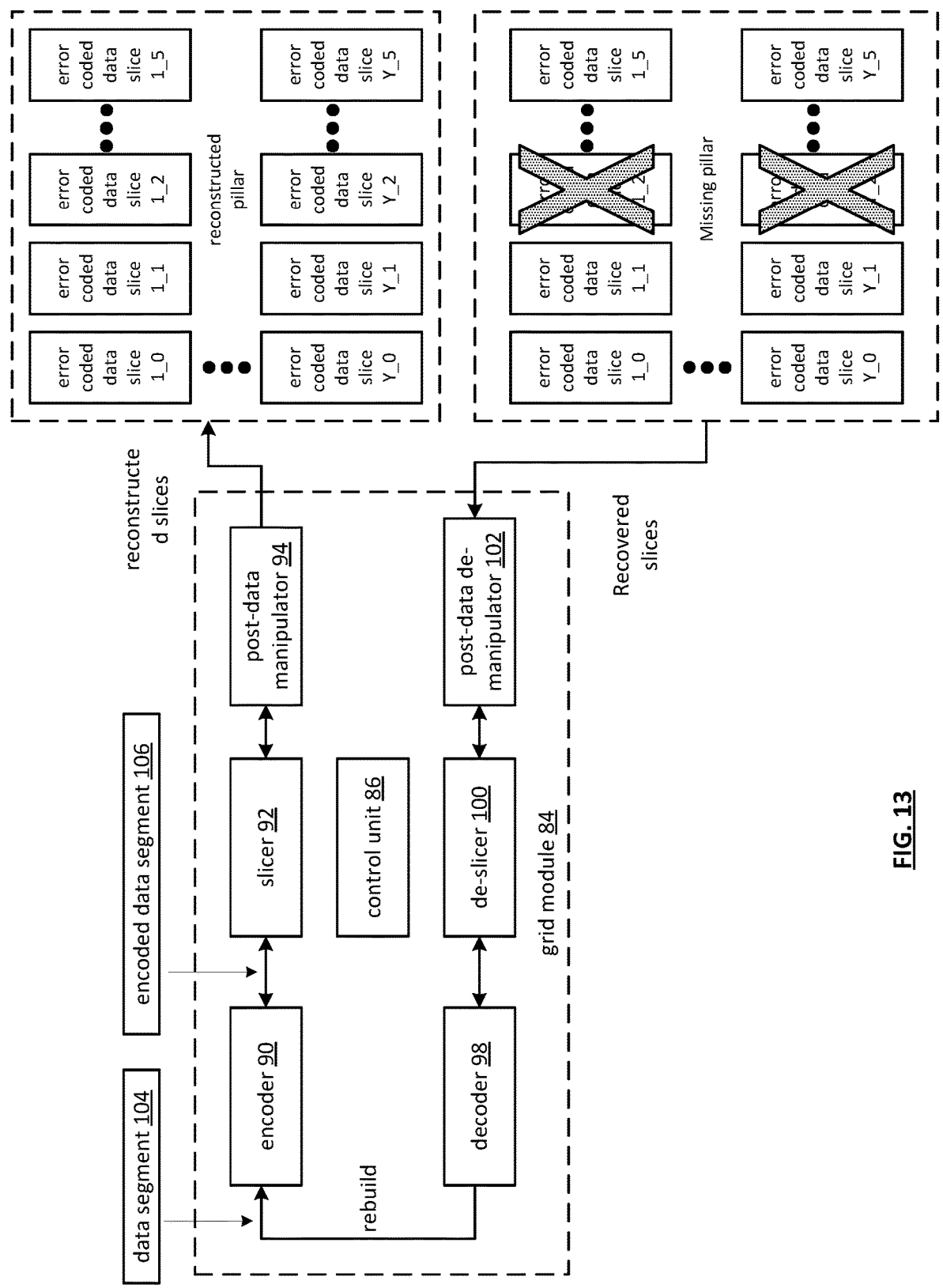
FIG. 13 is a schematic block diagram of another embodiment of a grid module in accordance with the invention.

FIG. 13 is a schematic block diagram of another embodiment of a grid module 84 configured for rebuilding a missing pillar of data slices. In this configuration, after detecting pillar of data slices is missing, the control unit 86 coordinates the recovery of the slices from the other pillars (e.g., from pillars 0, 1, 3, 4, and 5 when pillar 2 is the missing pillar). The post-data de-manipulator 102, the de-slicer 100, and the decoder 98 reconstruct the data segment(s) from the recovered data slices.

The encoder 90, the slicer 92, and the post-data manipulator 94 generates the rebuilt slices that are provided to the DS storage units. In this instance, the missing pillar of data is rebuilt. Note that the missing pillar of slices may be stored in the same DS storage unit as the missing pillar if the DS storage unit is back on line or stored in a different DS storage unit if the original DS storage unit is not back on line.

Figure 14:
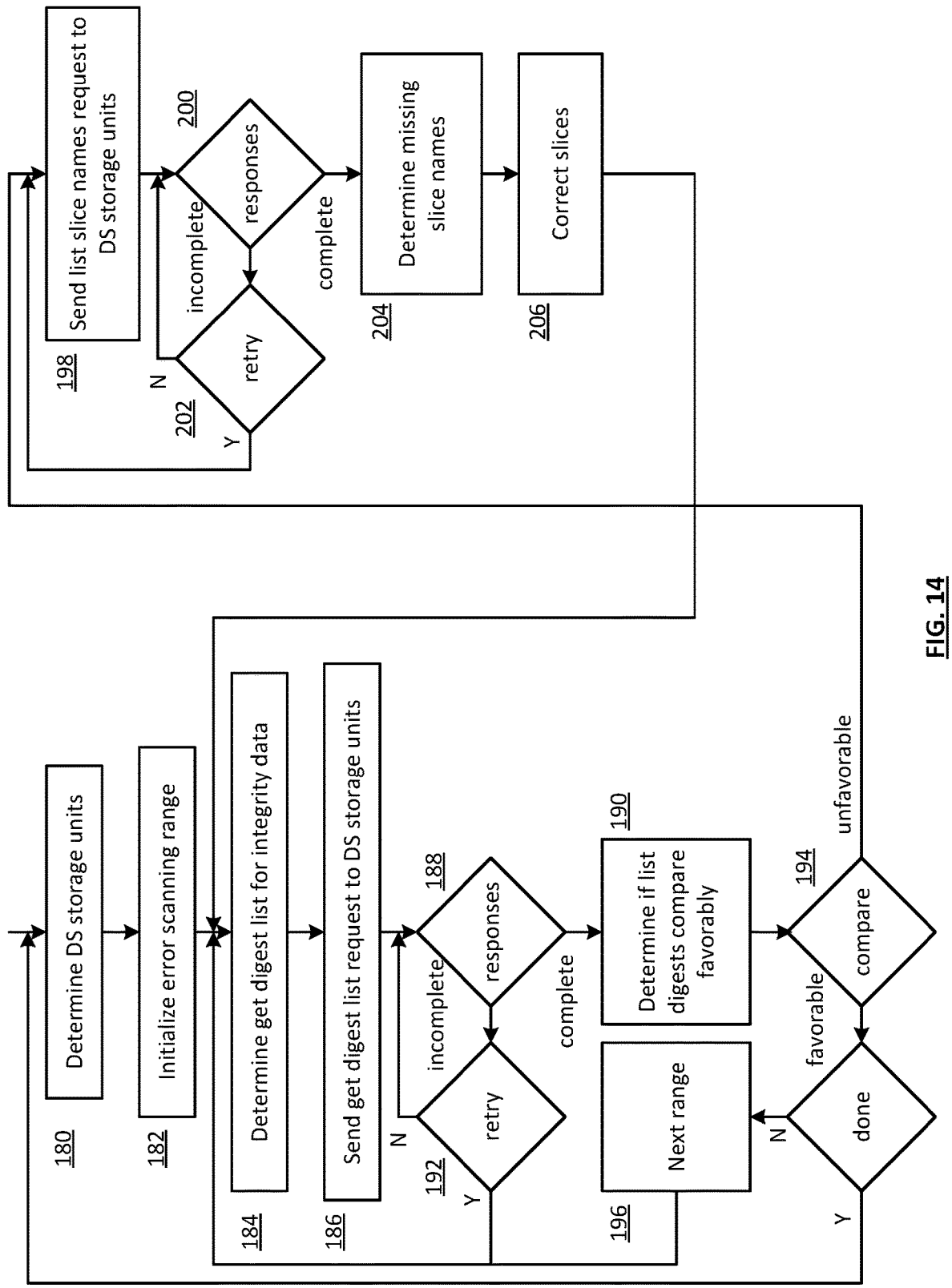
FIG. 14 is a logic diagram of another embodiment of a method for data rebuilding in accordance with the present invention.

FIG. 14 is a logic diagram of another embodiment of a method for data rebuilding that begins at step 180 where the grid module of the storage integrity processing unit 20 determines which DS storage units to scan for a particular vault. For example, the grid module may determine to scan DS storage units based on a lookup into the virtual DSN address to physical location table and/or based on a virtual address range assignment for the grid module. As an alternate example, the grid module may receive its virtual address range assignment from the DS managing unit, the DS processing unit, the user device, and/or the DS storage unit.

The method continues at step 182 where the grid module initializes the error scanning range to an initial address of the assigned address range for the vault, to a virtual address specified in a command, to a virtual address indicated by other error scanning functions, or to a random address randomly within the assigned address range. The method continues at step 184 where the grid module determines the error scanning range of a get digest list request (e.g., obtain integrity data for pluralities of data slices within the address range). The determination may be based on one or more of the error scanning range that was most recently scanned, where the error scanning range may have been initialized, the predetermined number, the system loading factor, the command from the DS managing unit, the vault size indicator, the error indicator of previous error ranges, a retry indicator, and/or where the scanning process left off on a previous scan.

The method continues at step 186 where the grid module sends the get digest list request to the DS storage units. The get digest list request may include a starting slice name (DSN virtual address) and a count of slice names to include in the digest. In another embodiment, the request includes a starting slice name, an ending slice name, and an increment of slices to advance in each list or test. The error scanning range includes the starting slice name through an ending slice name where the ending slice name is the count added to the starting slice name.

In response to the request, a DS storage unit may calculate the digest over the error scanning range to produce a get digest list request response. The digest may include performing a CRC32, hash function or other data verification function over the error scanning range of slice names to produce integrity data. The DS storage unit may send the get digest list request response (i.e., the integrity data for the address range) to the grid module.

The method continues at step 188, where the grid module determines whether responses received from the DS storage units are complete. For example, the grid module determines whether all of the expected responses have been received from the targeted DS storage units. If not, a retry mechanism is invoked at step 192. When the responses are complete, the method continues at step 190 where the grid module compares the get digest list request response (i.e., the integrity data) of one DS storage unit to the responses of other DS storage units. In other words, the grid module determines whether the integrity data is substantially the same from each of the DS storage units for the given address range (e.g., for one or more data segments).

The method branches at step 194 depending on whether the comparison was favorable. When the comparison was favorable, the method continues with the grid module determining whether the process is done. If not, the method repeats for the next range of addresses at step 196. If the comparison was unfavorable, the method continues at step 198 where the grid module sends a request for slice names to the DS storage units. The request may include a starting slice name (DSN virtual address) and a count of slice names to include in the list (count may be zero or greater). The error scanning range covers the starting slice name through an ending slice name where the ending slice name is the count added to the starting slice name. The error scanning range is identical to the error scanning range of the previous step that detected at least one error in the error scanning range.

Upon receive the subsequent request, the DS storage unit performs a local error detection check on each EC data slice specified in the error scanning range and may delete the locally stored slice name when the error detection check identifies an error. For example, the error detection check may include calculating a present CRC32 (hash function and/or any other data verifying function) over the data in the EC data slice and comparing the present CRC32 to a stored CRC32 (e.g., from the original store) for the same EC data slice. The DS storage unit may detect an error when the present CRC32 does not match the stored CRC32. The DS storage unit sends the list of slice names for the error scanning range in the form of the list slice names response to the grid module.

The method continues at step 200 where the grid module determines whether the responses are complete. If not, the method continues with the grid module initiating a retry mechanism at step 202. If the responses are complete, the method continues at step 204 where the grid module compares the list slice name response to that of the other responding DS storage units to determine which slice name is in error within this error scanning range. For example, if the grid module determines that the list slice name response is identical to the list slice name response from each of the other pillars, then the process may move to the next error scanning range. If the grid module determines that the list slice name response is not identical to the list slice name response from each of the other pillars, then the grid module may identify which one or more slice names are missing from the list slice name response. The method continues at step 206 where the grid module initiates correction of the error.

In an example of executing the method of FIG. 14, the processing module of the DS processing unit sends a request for integrity data to a plurality of DS storage units, wherein the request identifies one or more pluralities of data slices to be checked for errors. The integrity data may include one or more of but not limited to a cyclic redundancy check, a hash, and/or a digest list, of at least a portion of a slice name for one of the pluralities of data slices and/or of at least a portion of each of a group of slice names wherein the group of slice names corresponds to a group of the pluralities of data slices.

In the next step, the processing module receives, via the network interface, the integrity data from the plurality of DS storage units regarding one or more pluralities of data slices to produce a plurality of received integrity data, wherein a plurality of data slices of the one or more pluralities of data slices corresponds to a data segment. In the next step, the processing module evaluates the plurality of received integrity data by comparing one of the plurality of received integrity data with at least some of the plurality of the received integrity data to produce a comparison. The processing module indicates unfavorable results when the comparison is unfavorable. For example, the processing module indicates unfavorable results when the comparison of the plurality of received integrity data with at least some of the plurality of received integrity data indicates that they are not substantially the same.

In the next step, the processing module requests naming information of the one or more pluralities of data slices from the plurality of DS storage units when the evaluation of the plurality of received integrity data yields unfavorable results. The naming information may include at least a portion of a slice name, wherein the slice name includes a source name. Note that pillar slices of the same data segments have an identical source name.

In the next step, the processing module receives, via the network interface, the naming information from the plurality of DS storage units to produce a plurality of received naming information. The processing module evaluates the plurality of received naming information to identify at least one data slice of the one or more of pluralities of data slices having a data inconsistency. Note that a data inconsistency may include one or more of but not limited to an outdated data slice, a missing data slice and/or corrupted naming information. The processing module may evaluate the plurality of received naming information by comparing one of the plurality of received naming information with at least some of the plurality of the received naming information to identify at least one data slice of the one or more of pluralities of data slices having one or more of a revision level data inconsistency, a missing naming information data inconsistency and/or a corrupted naming information data inconsistency. The processing module rebuilds the at least one data slice of the one or more of pluralities of data slices having a data inconsistency.

In another example of operation, the processing module of the DS storage unit receives updated naming information for a data slice of the one or more data slices from time to time and the processing module stores the updated naming information. For example, the processing module may receive updated naming information when the processing module receives a new data slices to store.

The processing module may generate integrity data regarding one or more data slices of one or more pluralities of data slices, wherein a plurality of data slices of the one or more pluralities of data slices corresponds to a data segment. The processing module may generate the integrity data in response to a request and/or in accordance with a predetermined pattern (e.g., when a timer expires).

In the next step, the processing module transmits, via the network interface, the integrity data via a network to a computing core (e.g., of a DS processing unit, a storage integrity processing unit, a user device, a DS managing unit, and/or a DS unit). The processing module receives, via the network interface, a request for naming information for the one or more data slices. The processing module retrieves the naming information for the one or more data slices in response to receiving the request. The naming information may include at least a portion of a slice name, wherein the slice name includes a source name. The processing module transmits, via the network interface, the naming information for the one or more data slices. In an instance, the processing module transmits the naming information to a computing core of one or more of the DS processing unit, a storage integrity processing unit, a user device, a DS managing unit, and/or a DS unit.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A distributed storage network (DSN) system comprises:
a network interface;
at least one processing module operable to:
   detect a data error at a DSN pillar by:
      generating integrity data of one or more slice names of one or more error encoded data slices of one or more pluralities of the error encoded data slices without retrieving the one or more pluralities of the error encoded data slices and without retrieving the one or more slice names, wherein a plurality of the error encoded data slices of the one or more pluralities of the error encoded data slices corresponds to a dispersed storage error encoded data segment;
      evaluating the integrity data without using any of the one or more error encoded data slices for an inconsistency between the plurality of received integrity data;
      indicating an error based on the evaluating the integrity data indicating an inconsistency; and
      retrieving one or more slice names for the one or more error encoded data slices; and
   when detecting that a plurality of the data errors have occurred at one pillar, determining that a distributed storage (DS) unit failure has occurred; and
   after a predetermined time period, if the DS unit failure has not been resolved, rebuilding the error encoded data slices of the DS unit and storing them at another DS unit.

2. The distributed storage network (DSN) system of claim 1, wherein the least one processing module is further operable, when a DS unit failure is detected, to determine whether the DS unit failure is due to a temporary condition, and when the DS unit failure is due to a temporary condition, wait for the predetermined time period for the temporary condition to be resolved.

3. The distributed storage network (DSN) system of claim 2, wherein the processing module receives a maintenance indicator or a network connectivity indicator to indicate the temporary condition.

4. The distributed storage network (DSN) system of claim 1, wherein the predetermined time period is based on an estimate for bringing the failed DS unit back on line.

5. The distributed storage network (DSN) system of claim 1, wherein the determining that the DS unit failure has occurred is performed periodically.

6. The distributed storage network (DSN) system of claim 1, wherein the determining that the DS unit failure has occurred is based on one or more of: a plurality of error encoded data slice errors, no response, a scheduled DS unit outage, or numerous missing error encoded data slices.

7. The distributed storage network (DSN) system of claim 6, wherein the distributed storage network (DSN) system of claim 1, wherein the no response indicates one or more of: powered off storage units, network down, or equipment failure.

8. The distributed storage network (DSN) system of claim 6, wherein the distributed storage network (DSN) system of claim 1, wherein the scheduled DS unit outage includes testing a rebuild function.

9. The distributed storage network (DSN) system of claim 6, wherein the distributed storage network (DSN) system of claim 1, wherein the scheduled DS unit outage includes maintenance on the DS unit.

10. The distributed storage network (DSN) system of claim 1, wherein the another DS unit includes a DS unit located at a same DSN site or at a DSN site different from the failed DS unit.

11. A distributed storage network (DSN) system comprises:
a network interface;
at least one processing module operable to:
   detect a data error at a DSN storage unit by:
      generating integrity data of one or more slice names of one or more error encoded data slices of one or more pluralities of the error encoded data slices without retrieving the one or more pluralities of the error encoded data slices and without retrieving the one or more slice names, wherein a plurality of the error encoded data slices of the one or more pluralities of the error encoded data slices corresponds to a dispersed storage error encoded data segment;
      evaluating the integrity data without using any of the one or more error encoded data slices for an inconsistency between the plurality of received integrity data;
      indicating an error based on the evaluating the integrity data indicating an inconsistency; and
      retrieving one or more slice names for the one or more error encoded data slices; and
   when detecting that at least one data error has occurred at a plurality of storage units at a DSN site, determine that a DSN site failure has occurred; and
   after a predetermined time period, if the DSN site failure has not been resolved, rebuild the error encoded data slices of the DSN site and store them at another DSN site.

12. The distributed storage network (DSN) system of claim 11, wherein the least one processing module is further operable, when the DSN site failure is detected, to determine whether the DSN site failure is due to a temporary condition, and when the DSN site failure is due to a temporary condition, wait for the predetermined time period for the temporary condition to be resolved.

13. The distributed storage network (DSN) system of claim 12, wherein the processing module receives a maintenance indicator or a network connectivity indicator indicating the temporary condition.

14. The distributed storage network (DSN) system of claim 11, wherein the predetermined time period is based on an estimate for bringing the failed DSN site back on line.

15. The distributed storage network (DSN) system of claim 11, wherein the determine that a DSN site failure has occurred is performed periodically.

16. The distributed storage network (DSN) system of claim 11 further comprises determining whether a distributed storage (DS) unit failure has occurred based on one or more of: a plurality of error encoded data slice errors, no response, a scheduled DS unit outage, and/or numerous missing error encoded data slices.

17. The distributed storage network (DSN) system of claim 16, wherein the no response indicates one or more of: powered off storage units, network down, or equipment failure.

18. The distributed storage network (DSN) system of claim 16, wherein the scheduled DS unit outage includes maintenance on the DSN site.

19. The distributed storage network (DSN) system of claim 11, wherein the DSN site failure includes one or more of: the DSN site is down for maintenance, the DSN site is down for updates, network is temporarily down, or a scheduled DSN site outage.

20. A method in distributed storage network (DSN) system comprises:
  detecting a data error at one or more DSN pillars including:
    generating integrity data of one or more slice names of one or more error encoded data slices of one or more pluralities of the error encoded data slices without retrieving the one or more pluralities of the error encoded data slices and without retrieving the one or more slice names, wherein a plurality of the error encoded data slices of the one or more pluralities of the error encoded data slices corresponds to a dispersed storage error encoded data segment;
    evaluating the integrity data without using any of the one or more error encoded data slices for an inconsistency between the plurality of received integrity data;
    indicating an error based on the evaluating the integrity data indicating an inconsistency; and
    retrieving one or more slice names for the one or more error encoded data slices; and
  when detecting that a plurality of the data errors have occurred at one DSN pillar, determining that a distributed storage (DS) unit failure has occurred; and
  after a predetermined time period, rebuilding the error encoded data slices of the DS unit and storing them at another DS unit.

* * * * *